(12) United States Patent
Espalin et al.

(10) Patent No.: US 10,913,202 B2
(45) Date of Patent: Feb. 9, 2021

(54) STRUCTURALLY INTEGRATING METAL OBJECTS INTO ADDITIVE MANUFACTURED STRUCTURES

(71) Applicant: The Board of Regents, The University of Texas System, Austin, TX (US)

(72) Inventors: David Espalin, El Paso, TX (US); Eric MacDonald, El Paso, TX (US); Ryan B. Wicker, El Paso, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 382 days.

(21) Appl. No.: 15/559,423

(22) PCT Filed: Mar. 14, 2016

(86) PCT No.: PCT/US2016/022292
§ 371 (c)(1),
(2) Date: Sep. 18, 2017

(87) PCT Pub. No.: WO2016/149181
PCT Pub. Date: Sep. 22, 2016

(65) Prior Publication Data
US 2018/0079131 A1 Mar. 22, 2018

Related U.S. Application Data

(60) Provisional application No. 62/135,249, filed on Mar. 19, 2015.

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/165* (2017.08); *B29C 64/209* (2017.08);
(Continued)

(58) Field of Classification Search
CPC ....... B29C 64/106; B29C 70/70; B29C 64/20; B29C 70/68–887; B29C 64/165;
(Continued)

(56) References Cited

U.S. PATENT DOCUMENTS

| 5,121,329 A | 6/1992 | Crump |
| 6,129,872 A * | 10/2000 | Jang ...................... B33Y 30/00 264/75 |

(Continued)

FOREIGN PATENT DOCUMENTS

WO   WO2014193505   * 12/2014

OTHER PUBLICATIONS

Lopes, et al.,"Emerald Article: Integrating stereolithography and direct print technologies for 3D structural electronics fabrication," Rapid Prototyping Journal, vol. 18, Issue 2, 2012, pp. 129-143. Abstract only.

(Continued)

*Primary Examiner* — Jeffrey M Wollschlager
(74) *Attorney, Agent, or Firm* — Yee & Associates, P.C.

(57) ABSTRACT

Methods, systems, and devices for the manufacture of 3D printed components with structurally integrated metal objects using an additive manufacturing system enhanced with a range of possible secondary embedding processes. One or more layers of a three-dimensional substrate can be created by depositing a substrate, and then one or more 3D printed components can be configured on the substrate with one or more metal objects using additive manufacturing enhanced by one or more secondary embedding processes.

3 Claims, 5 Drawing Sheets

(51) Int. Cl.
  *B29C 70/70* (2006.01)
  *B29C 64/209* (2017.01)
  *B29C 64/336* (2017.01)
  *B29C 64/165* (2017.01)
  *B33Y 30/00* (2015.01)
(52) U.S. Cl.
  CPC ............ *B29C 64/336* (2017.08); *B29C 70/70* (2013.01); *B33Y 10/00* (2014.12); *B33Y 30/00* (2014.12)
(58) Field of Classification Search
  CPC ... B29C 64/118; B29C 64/209; B29C 64/336; B33Y 30/00; B33Y 10/00
  See application file for complete search history.

(56) References Cited

U.S. PATENT DOCUMENTS

| | | | |
|---|---|---|---|
| 6,153,034 A * | 11/2000 | Lipsker | B29C 41/36 156/73.1 |
| 7,357,887 B2 * | 4/2008 | May | G06K 19/06 156/62.2 |
| 7,419,630 B2 | 9/2008 | Palmer et al. | |
| 7,555,357 B2 | 6/2009 | Holzwarth | |
| 7,556,490 B2 | 7/2009 | Wicker et al. | |
| 7,604,470 B2 * | 10/2009 | LaBossiere | B29C 48/2556 425/131.1 |
| 7,658,603 B2 | 2/2010 | Medina et al. | |
| 7,959,847 B2 | 6/2011 | Wicker et al. | |
| 8,252,223 B2 | 8/2012 | Medina et al. | |
| 8,827,684 B1 * | 9/2014 | Schumacher | B29C 64/209 425/375 |
| 9,126,367 B1 * | 9/2015 | Mark | B29C 70/16 |
| 9,440,397 B1 * | 9/2016 | Fly | B33Y 10/00 |
| 9,511,543 B2 * | 12/2016 | Tyler | B29C 70/06 |
| 9,671,533 B2 * | 6/2017 | Hannington | G02B 5/128 |
| 9,931,778 B2 * | 4/2018 | Bogucki | B29C 48/022 |
| 10,059,057 B2 * | 8/2018 | Schirtzinger | B29C 64/112 |
| 10,259,081 B2 * | 4/2019 | MacDonald | B33Y 10/00 |
| 10,562,226 B1 * | 2/2020 | Cohen | B29C 70/382 |
| 2007/0228590 A1 * | 10/2007 | LaBossiere | B29C 48/2556 264/40.1 |
| 2008/0006966 A1 * | 1/2008 | Mannella | B29C 64/106 264/259 |
| 2008/0233528 A1 * | 9/2008 | Kim | A61C 7/146 433/2 |
| 2009/0177309 A1 * | 7/2009 | Kozlak | B29C 64/321 700/119 |
| 2010/0216085 A1 * | 8/2010 | Kopelman | A61C 7/146 433/24 |
| 2011/0121476 A1 | 5/2011 | Batchelder et al. | |
| 2011/0180348 A1 * | 7/2011 | Nonogi | B32B 7/14 181/294 |
| 2012/0164256 A1 * | 6/2012 | Swanson | B29C 41/52 425/162 |
| 2013/0170171 A1 * | 7/2013 | Wicker | H01L 21/4846 361/809 |
| 2013/0197683 A1 * | 8/2013 | Zhang | B22F 3/1055 700/96 |
| 2014/0061974 A1 * | 3/2014 | Tyler | B29C 70/06 264/401 |
| 2014/0232035 A1 * | 8/2014 | Bheda | B29C 64/118 264/148 |
| 2014/0268604 A1 * | 9/2014 | Wicker | B29C 70/885 361/760 |
| 2014/0268607 A1 * | 9/2014 | Wicker | H05K 1/0284 361/761 |
| 2014/0277664 A1 * | 9/2014 | Stump | G06F 17/50 700/98 |
| 2014/0287139 A1 * | 9/2014 | Farmer | B05D 3/002 427/212 |
| 2014/0291886 A1 * | 10/2014 | Mark | B29C 70/384 264/163 |
| 2014/0328963 A1 * | 11/2014 | Mark | B29C 64/393 425/143 |
| 2014/0361460 A1 * | 12/2014 | Mark | B29C 70/521 264/248 |
| 2015/0048553 A1 * | 2/2015 | Dietrich | B33Y 40/00 264/401 |
| 2015/0093283 A1 * | 4/2015 | Miller | A61F 2/3859 419/55 |
| 2015/0099087 A1 * | 4/2015 | Reznar | B29C 70/68 428/68 |
| 2015/0108677 A1 * | 4/2015 | Mark | B29C 64/165 264/138 |
| 2015/0165942 A1 * | 6/2015 | Laird | B60N 2/42709 297/411.22 |
| 2015/0202646 A1 * | 7/2015 | Fischer | B05C 1/04 427/434.6 |
| 2015/0249043 A1 * | 9/2015 | Elian | H01L 21/4867 257/684 |
| 2015/0367576 A1 * | 12/2015 | Page | B29C 64/112 264/257 |
| 2016/0012935 A1 * | 1/2016 | Rothfuss | C04B 14/48 252/62.54 |
| 2016/0114532 A1 * | 4/2016 | Schirtzinger | B29C 64/147 428/411.1 |
| 2016/0136885 A1 * | 5/2016 | Nielsen-Cole | B29C 48/30 425/462 |
| 2016/0198576 A1 * | 7/2016 | Lewis | B33Y 80/00 361/761 |
| 2016/0263822 A1 * | 9/2016 | Boyd, IV | B23K 26/00 |
| 2017/0042034 A1 * | 2/2017 | MacCurdy | H01L 27/01 |
| 2017/0210074 A1 * | 7/2017 | Ueda | B33Y 10/00 |
| 2017/0361497 A1 * | 12/2017 | Crescenti Savall | B33Y 10/00 |
| 2018/0036972 A1 * | 2/2018 | Talgorm | B29C 70/745 |

OTHER PUBLICATIONS

Lopes, et al. ,"Expanding rapid prototyping for electronic systems integration of arbitrary form," University of Texas at El Paso, Sep. 14, 2006,12 pages, https://sffsymposium.engr.utexas.edu/Manuscripts/2006/2006-56-Lopes.pdf.

Lopes, "Hybrid manufacturing: Integrating stereolithography and direct print technologies," Ph.D. Dissertation, The University of Texas at El Paso, 2010, 128 pages. Abstract only found at http://digitalcommons.utep.edu/dissertations/AAI3433546.

Roberson, et al., "Microstructural and Process Characterization of Conductive Traces Printed from Ag Particulate Inks," Materials, vol. 4, Issue 6, 2011, pp. 963-979.

\* cited by examiner

STRUCTURALLY INTEGRATING METAL OBJECTS INTO ADDITIVE MANUFACTURED STRUCTURES

RELATED APPLICATION

This application claims the benefit of Patent Cooperation Treaty International Application Number PCT/US16/22292, filed Mar. 14, 2016, and entitled "STRUCTURALLY INTEGRATING METAL OBJECTS INTO ADDITIVE MANUFACTURED STRUCTURES" which claims Provisional Application No. 62/135,249 filed Mar. 19, 2015, and entitled "EMBEDDING APPARATUS AND METHOD."

BACKGROUND INFORMATION

1. Field

Embodiments are related to the field of additive manufacturing. Embodiments further relate to the manufacture of three-dimensional (3D) printed components with structurally integrated metal objects using an additive manufacturing system enhanced with a range of possible secondary embedding processes.

2. Background

The next generation of manufacturing technology will require complete spatial control of material and functionality as structures are created layer-by-layer, thereby providing fully customizable, high value, multi-functional products for the consumer, biomedical, aerospace, and defense industries. With contemporary additive manufacturing ("AM"—also known more popularly as 3D printing) providing the base fabrication process, a comprehensive manufacturing suite will be integrated seamlessly to include: 1) additive manufacturing of a wide variety of robust plastics/metals; 2) micromachining; 3) laser ablation; 4) embedding of wires, metal surfaces, and fine-pitch meshes submerged within the thermoplastics; 5) micro-dispensing; and 6) robotic component placement.

Collectively, the integrated technologies will fabricate multi-material structures through the integration of multiple integrated manufacturing systems (multi-technology) to provide multi-functional products (e.g., consumer wearable electronics, bio-medical devices, defense, space, and energy systems, etc.). Paramount to this concept is the embedding of highly conductive and densely routed traces and surfaces within the 3D printed dielectric structures.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for the manufacture of 3D printed components with structurally metal objects using an additive manufacturing system enhanced with a range of possible secondary embedding processes.

It is another aspect of the disclosed embodiments to provide for an additive manufacturing system for embedding metal objects within a structure in order to provide additional functionality such as improved mechanical strength or increased thermal or electrical conductivity.

The aforementioned aspects and other objectives and advantages can now be achieved as described herein. In an example embodiment, a method of making a three-dimensional electronic or electromechanical component/device can be implemented, which includes steps or operations for creating one or more layers of a three-dimensional substrate by depositing a substrate; and configuring on the substrate one or more 3D printed components with one or more metal objects utilizing additive manufacturing enhanced by one or more secondary embedding processes.

In another example embodiment, a three-dimensional electronic or electromechanical apparatus can be implemented, which includes one or more layers of a three-dimensional substrate deposited on a substrate; and one or more 3D printed component configured on the substrate with one or more metal objects utilizing additive manufacturing enhanced by one or more secondary embedding processes.

Method, systems, and devices are thus disclosed for the manufacture of 3D printed components with structurally integrated metal objects using an additive manufacturing system enhanced with a range of possible secondary embedding processes. The term "structurally integrated" is defined as being connected to the structure in a such a way as to (1) require a force to remove the metal object from the structure, and (2) provide an improvement in the properties of the plastic structure mechanically, thermally, and/or electrically.

Metal structures include wires with diameters ranging from sub-micron sizes upwards to almost any diameter, beams of rectangular, triangular, or any other arbitrary cross sectional geometry, lattice structures, wire meshes, metal foils, metal sheets. Any additive manufacturing system or any enhanced version of such a system that includes other complementary manufacturing processes to improve the fabricated structure either inside or outside the build envelope is included.

Secondary processes can include, but are not limited to (1) pressing the metal object into a printed press-fit channel, (2) pressing and curing the object into a channel or surface that is lined with deposited adhesive, (3) pressing a pre-coated adhesive object into a channel or surface and curing, (4) extruding both thermoplastic and thermoplastic embedded wire, (5) pressing an object into a channel and stapling the object into the structure at regular intervals, (6) pressing a pre-adhesive-coated metal foil onto a 3D printed surface, milling the metal foil to expose some fraction of the underlying 3D printed surface, continuing the 3D printing ensuring adhesion of the new thermoplastic layers to the exposed underlying thermoplastic layers, and once complete, providing a fully embedded and integrated foil piece within the thermoplastic structure, and (7) the copper wire and thermoplastic material are simultaneously deposited such that the copper wire is embedded within the thermoplastic material.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
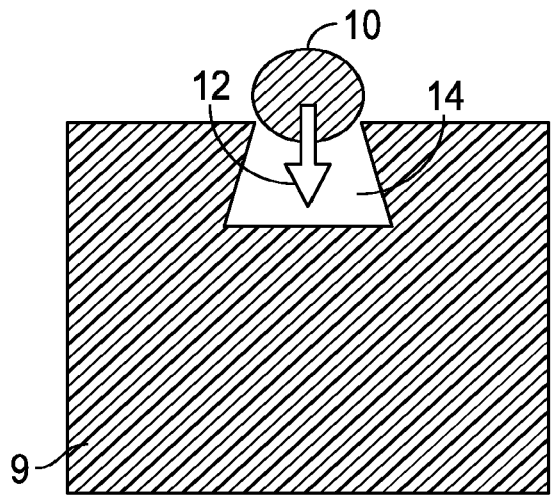
FIG. 1 illustrates a cross-sectional view of a press-fit channel that can be 3D printed and then filled with a pressed metal object, in accordance with a preferred embodiment.
Figure 1:
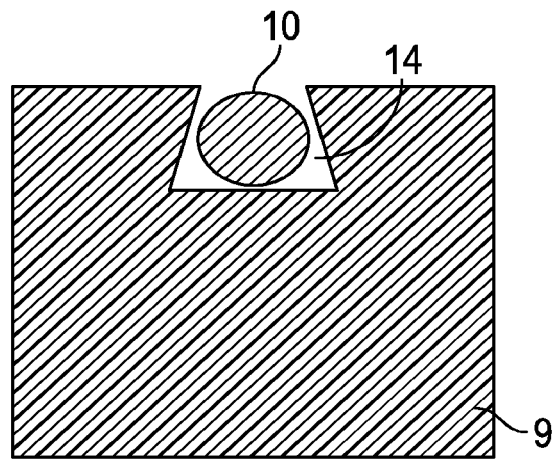

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like, or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The disclosed embodiments relate in general to the manufacture of 3D printed components with structurally integrated (defined below in A) metal objects (defined below in B) using an additive manufacturing system (defined below in C) enhanced with a range of possible secondary embedding processes (defined below in D).

Section A—"Structurally integrated" can be defined as being connected to the structure in a such a way as to (1) require a force to remove the metal object from the structure, and (2) provide an improvement in the properties of the plastic structure mechanically, thermally, and/or electrically.

Section B—Metal objects or structures can include wires with diameters ranging from sub-micron sizes upwards to almost any diameter, beams of rectangular, triangular, or any other arbitrary cross-sectional geometry, lattice structures, wire meshes, metal foils, metal sheets.

Section C—An additive manufacturing system or any enhanced version of such a system can include other complementary manufacturing processes to improve the fabricated structure either inside or outside the build envelope.

Section D—The term "secondary processes" can include, but is not limited to, for example, (1) pressing the metal object into a printed press-fit channel, (2) pressing and curing the object into a channel or surface that is lined with deposited adhesive, (3) pressing a pre-coated adhesive object into a channel or surface and curing, (4) pressing an object into a channel and stapling the object into the structure at regular intervals, (5) pressing a pre-adhesive-coated metal foil onto a 3D printed surface, milling the metal foil to expose some fraction of the underlying 3D printed surface, continuing the 3D printing ensuring adhesion of the new thermoplastic layers to the exposed underlying thermoplastic layers, and once complete, providing a fully embedded and integrated foil piece within the thermoplastic structure.

FIG. 1 illustrates a cross-sectional view of a press-fit channel 14 that can be 3D printed and then filled with a pressed metal object 10, in accordance with a preferred embodiment. The channel 14 can be formed from a structure 9, which maintains one or more channels such as channel 14. Note that in FIG. 1, the press-fit channel 14 and pressed metal object 10 are shown at Time 1 and Time 2. Arrow 12 indicates the direction or path taken by the pressed metal object 10 into the press-fit channel 14, as shown at Time 1. Then, as shown at Time 2 in FIG. 1, the pressed metal object 10 is shown within the press-fit channel 14. The cross-sectional view depicted in FIG. 1 thus illustrates 3D printed press fit channels and indicates that subsequent 3D printing is possible.

Figure 2:
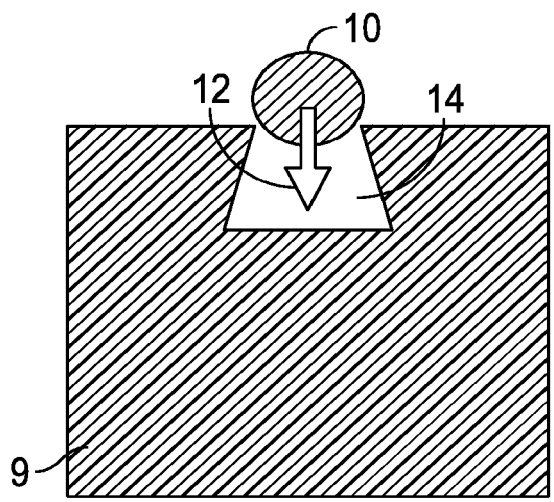
FIG. 2 illustrates a cross-sectional view of a channel that can be 3D printed and then filled with the pressed metal object and then stapled at regular intervals, in accordance with an alternative embodiment.
Figure 2:
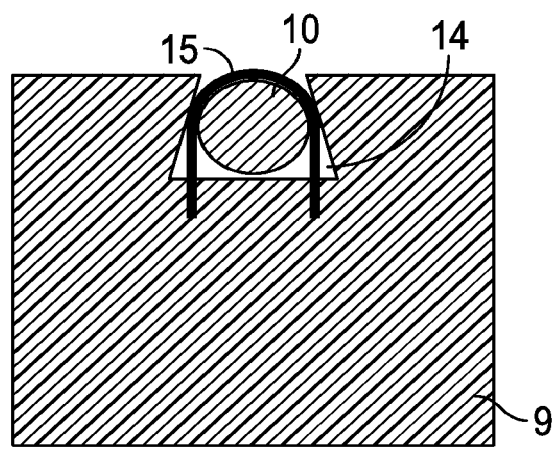

FIG. 2 illustrates a cross-sectional view of a channel (e.g., possibly press-fit design) 14 that can be 3D printed and then filled with the pressed metal object 10 and then stapled at regular intervals, in accordance with an alternative embodiment. Thus, the press-fit channel 14 is shown at Time 1 in FIG. 2 with respect to arrow 12 and the pressed metal object 10. At Time 2 shown in FIG. 2, the metal object 10 is shown stapled via wire 15 and within the channel 14. The 3D printed channel 14 can thus hold the wire 15 (which can be press fit, but not necessary), which is stapled to the structure 9 within channel 10. Subsequent 3D printing is possible.

Figure 3:
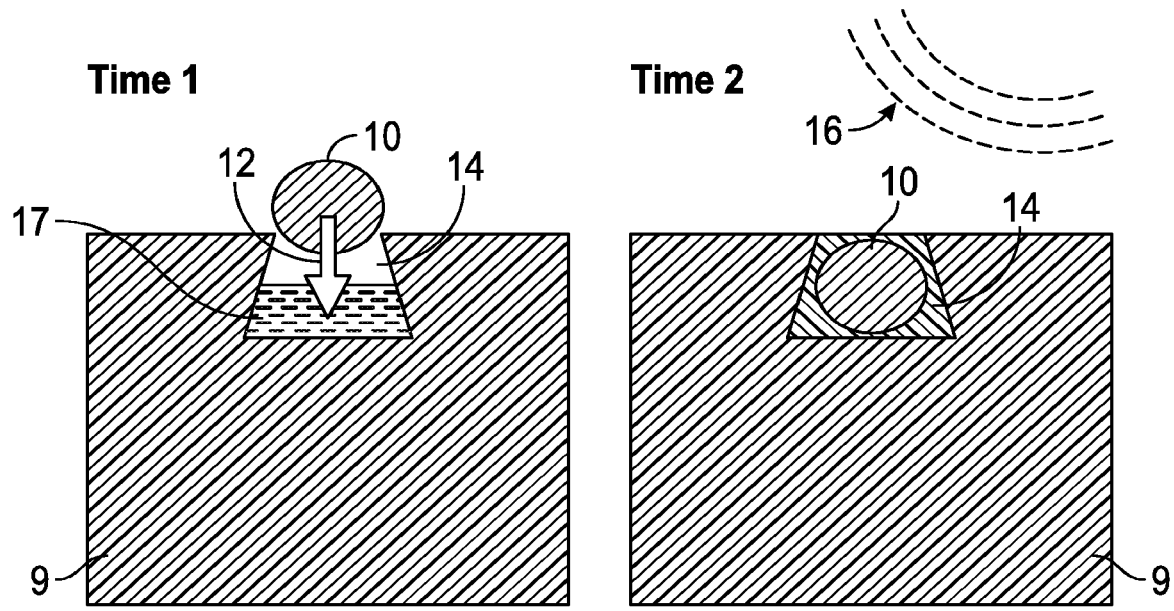
FIG. 3 illustrates a cross-sectional view of a channel, which can be 3D printed, filled with adhesive, and then filled with a pressed metal object and subsequently cured, in accordance with an alternative embodiment.

FIG. 3 illustrates a cross-sectional view of channel 14 (e.g., possibly a press-fit design), which can be 3D printed, filled with adhesive, and then filled with a pressed metal object and subsequently cured, in accordance with an alternative embodiment. As shown at Time 1, the metal object is shown with respect to channel 14 and arrow 12. An adhesive 17 is shown filled within channel 14. At time 2, the channel 14, adhesive 17, and metal object 10 are depicted as subject to a curing 16 (e.g., curing energy). Thus, 3D printed channels can hold the metal object, such as a wire (and may be press fit, but not necessarily). UV or thermal cured adhesive 17 can be deposited in the channel 14. As shown at Time 1 in FIG. 3, the metal object 10 an be inserted into channel 14 having the adhesive 17 and then cured (via curing 16) as depicted at Time 2. Subsequent 3D printing is possible.

Figure 4:
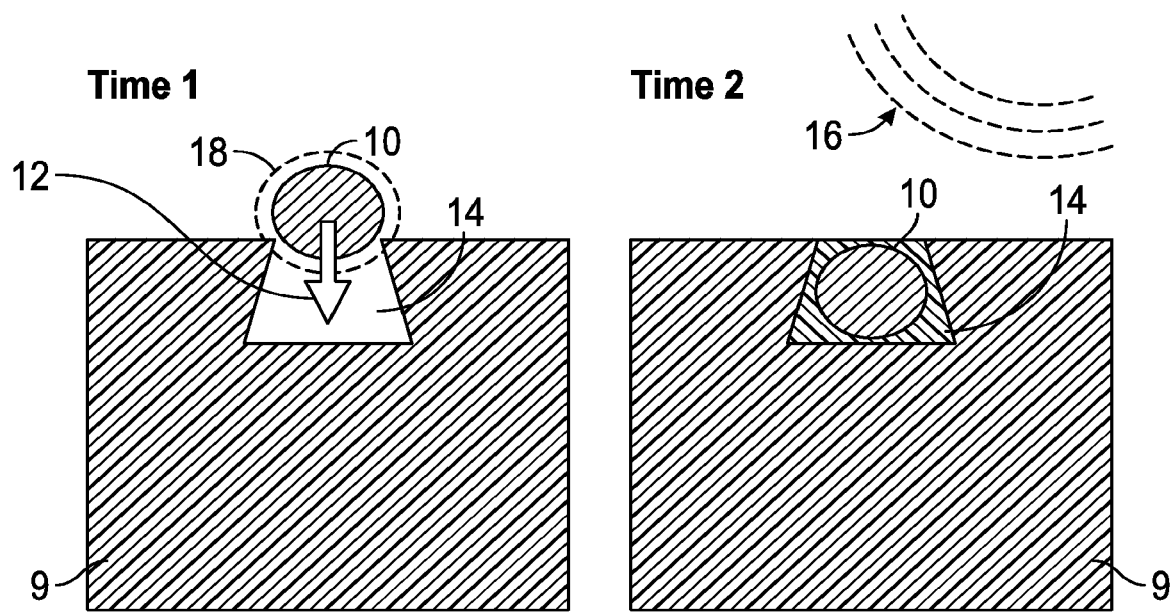
FIG. 4 illustrates a cross-sectional view of a channel that can be 3D printed, filled with adhesive-coated wire.

FIG. 4 illustrates a cross-sectional view of a channel 14 (e.g., possibly a press-fit design) that can be 3D printed, filled with adhesive-coated wire, and subsequently cured, in accordance with an alternative embodiment. As shown at Time 1 in FIG. 14, the metal object 10 is coated with a thermally curable adhesive 18 and then inserted (as indicated by arrow 12) into the channel 14. The 3D printed channel 14 can hold the metal object 10 (which can be press fit as shown, but not necessary), and can then be subject to a curing cycle (i.e., curing 16), as shown at Time 2. Subsequent printing is possible.

Figure 5:
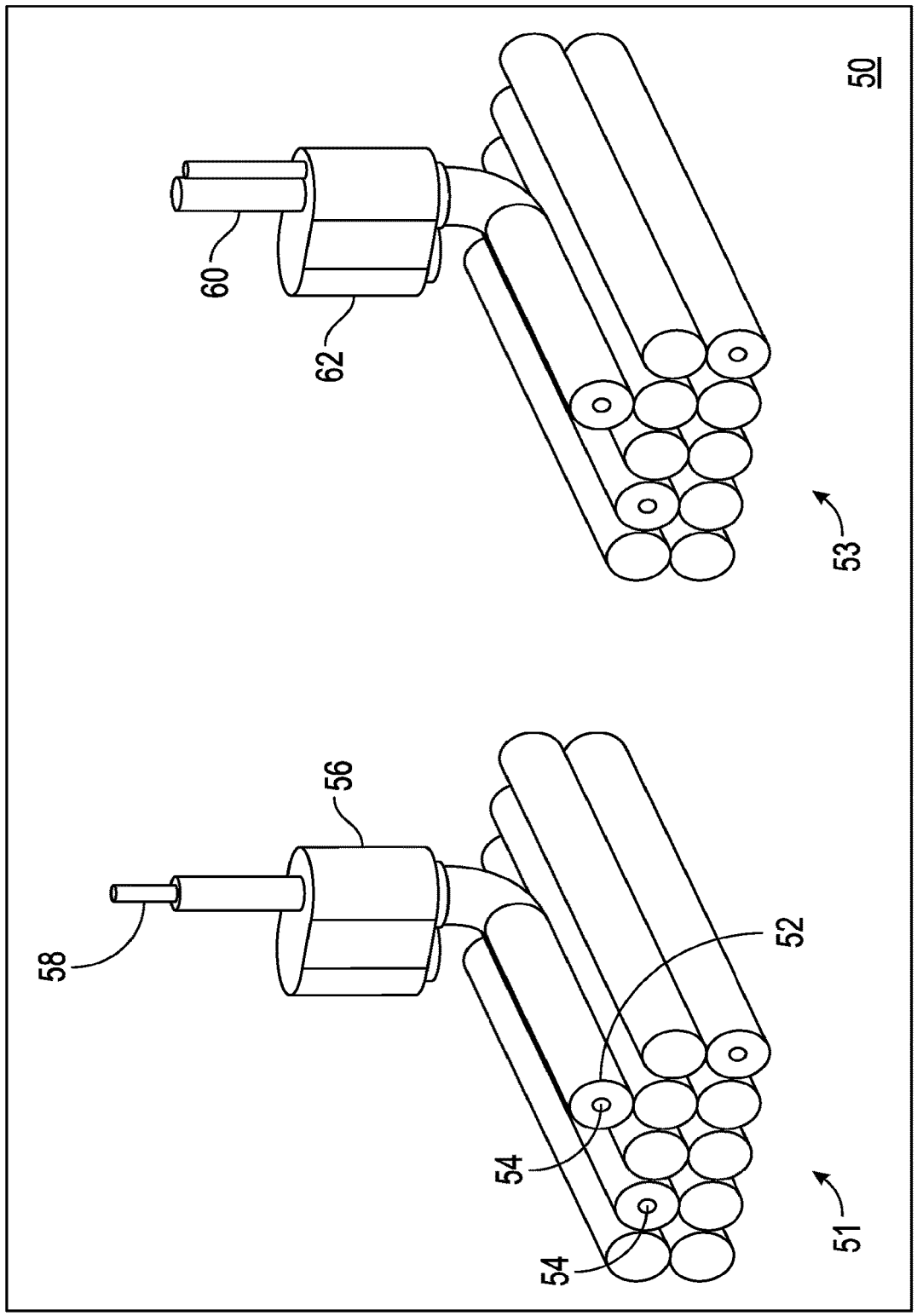
FIG. 5 illustrates cross-sectional views of an extruded thermoplastic filament wherein some filaments include a coaxial metal wire that can be used as interconnect or for reinforcements from a structural standpoint, in accordance with an alternative embodiment.

FIG. 5 illustrates cross-sectional views of an extruded thermoplastic filament where some filaments include a coaxial metal wire that can be used as interconnect or for reinforcements from a structural standpoint, in accordance with an alternative embodiment. Example filaments 51 and 53 are depicted in FIG. 5. Filaments 51 can include, for example, an arrangement 58 composed of a thermoplastic filament 51 having a metal core. Extrusion and coextrusion tips 56 are also shown with respect to the thermoplastic filament configuration or arrangement 58. Examples of metal(s) 54 and thermoplastic 52 are depicted in the context of filaments 51. Example filaments 53 are shown with features including a separate thermoplastic filament and metal wire arrangement 60. Extrusion and coextrusion tips 62 are also illustrated in FIG. 5 with respect to filaments 52.

The thermoplastic and metal wire can be simultaneously fed into an extrusion head. The materials can be fed in as a thermoplastic filament with a metal core. Alternatively, a separate thermoplastic filament and metal wire can be fed into the extrusion head. Within the head, the metal wire will be placed in the center of the hot, flowing plastic and coextruded at the exit of the extrusion tip. At the exit of the extrusion tip, the wire and thermoplastic are coextruded such that the thermoplastic is covering the wire. The thermoplastic covering the wire allows fusion to previously deposited material such that the wire is fixed within the part or on the surface of the part.

Figure 6:
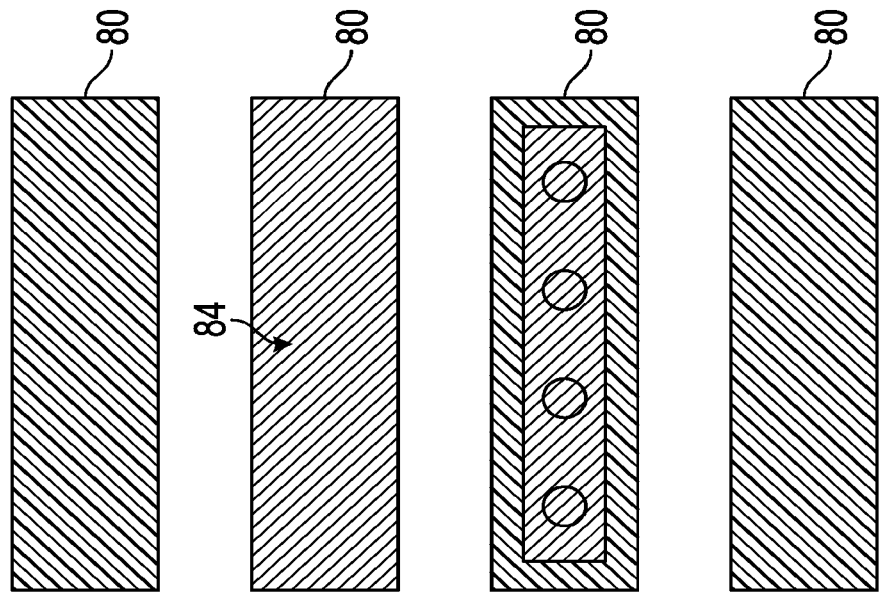
FIG. 6 illustrates a method in which a sheet that can be adhesively fixed to a 3D printed surface, milled to allow for openings to the original thermoplastic surface in order to allow for adhesion to subsequent thermoplastic layers, and for the full embedding of the foil in the structure, in accordance with an alternative embodiment.
Figure 6:
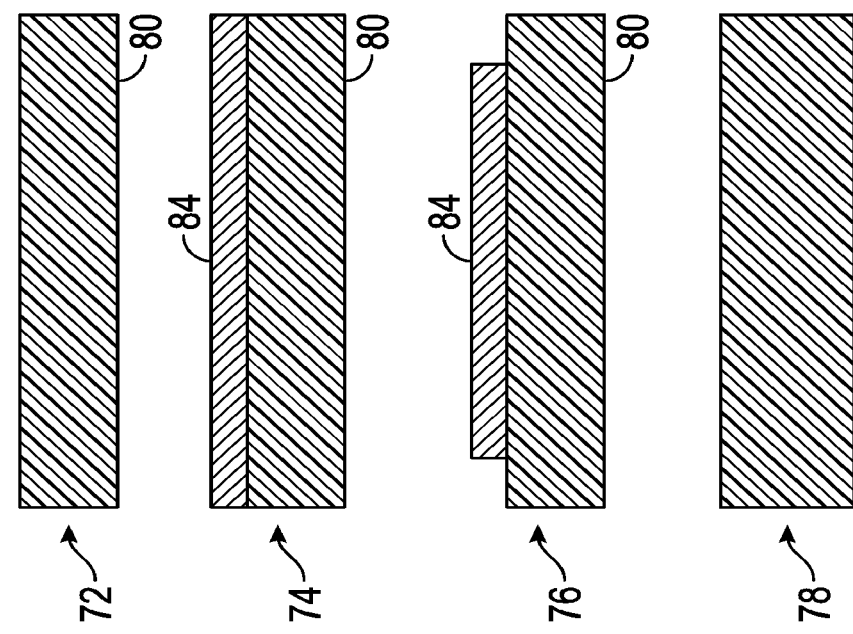

FIG. 6 illustrates a method 70 in which a sheet 80 that can be adhesively fixed to a 3D printed surface, milled to allow for openings to the original thermoplastic surface in order to allow for adhesion to subsequent thermoplastic layers and for the full embedding of the foil in the structure, in accordance with an alternative embodiment. The method 70 shown in FIG. 6 includes process steps 72, 74, 76, and 78 with respect to the cross-sectional and top views of the structure. As shown at step 72, the initial structure 80 is provided. Then, as depicted at step 74, an operation can be implemented in which a foil 84 is attached with an adhesive on top of the initial structure 80. Then, as shown at step 76, the foil 84 can be milled exposing the original structure 80 below. Thereafter, as depicted at step 76, the foil 84 can be completely embedded and new layers of thermoplastic can adhere to the original structure 80.

Figure 7:
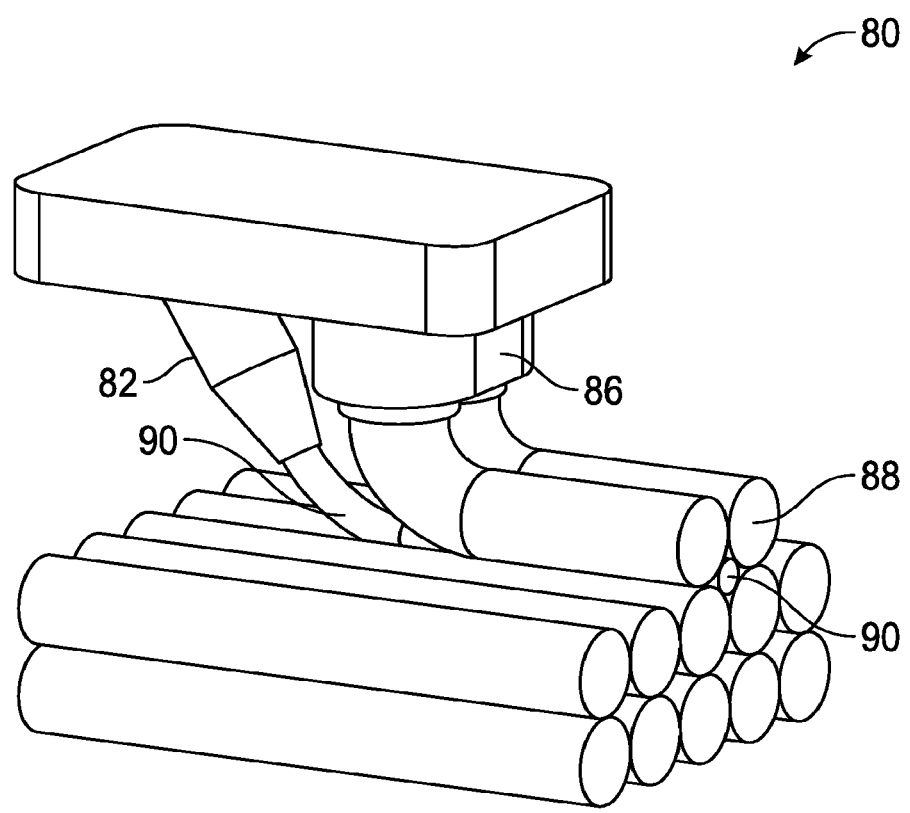
FIG. 7 illustrates a pictorial cross-sectional diagram depicting the use of a tool having two extrusion tips and one metal wire-dispensing tip, in accordance with an alternative embodiment.

FIG. 7 illustrates a pictorial cross-sectional diagram depicting the use of a tool 80 having two extrusion tips and one metal wire-dispensing tip, in accordance with an alternative embodiment. The wire-dispensing tip would lead the motion and the extrusion tips would follow. In this configuration, the wire will be placed in the desired location before being encapsulated (or embedded) by the overlaying thermoplastic beads. The tool 80 includes a double extruder head 86 and, for example, extruded thermoplastic 88 and an embedded metal wire 90. A wire feeder 82 is shown with respect to another portion of the wire 90.

The tool 80 shown in FIG. 7 can utilize, for example, two extrusion tips and one copper wire-dispensing tip (e.g., the wire feeder 82). Such a copper wire-dispensing tip would lead the motion and the extrusion tips would follow. In this configuration, the copper wire 90 will be placed in the desired location before being encapsulated (or embedded) by the overlaying thermoplastic beads.

Methods, systems, and devices are thus disclosed for the manufacture of 3D printed components with structurally integrated metal objects using an additive manufacturing system enhanced with a range of possible secondary embedding processes. Secondary processes include, but are not limited to (1) pressing the metal object into a printed press-fit channel, (2) pressing and curing the object into a channel or surface that is lined with deposited adhesive, (3) pressing a pre-coated adhesive object into a channel or surface and curing, (4) extruding both thermoplastic and thermoplastic embedded wire, (5) pressing an object into a channel and stapling the object into the structure at regular intervals, (6) pressing a pre-adhesive-coated metal foil onto a 3D printed surface, milling the metal foil to expose some fraction of the underlying 3D printed surface, continuing the 3D printing ensuring adhesion of the new thermoplastic layers to the exposed underlying thermoplastic layers, and once complete, providing a fully embedded and integrated foil piece within the thermoplastic structure, and (7) the copper wire and thermoplastic material are simultaneously deposited such that the copper wire is embedded within the thermoplastic material.

Based on the foregoing, it can be appreciated that a number of embodiments, preferred and alternative, are disclosed herein. In one example embodiment, a method of making a three-dimensional electronic or electromechanical component/device can be implemented, which includes the steps or operations of creating one or more layers of a three-dimensional substrate by depositing a substrate; and configuring on the substrate one or more 3D printed components with one or more metal objects utilizing additive manufacturing enhanced by one or more secondary embedding processes.

In some example embodiments, the secondary embedding process can involve pressing the metal object(s) into one or more printed press-fit channels configured from the substrate. In another example embodiment, the secondary embedding process can involve pressing and curing the object into a channel or a surface of a substrate that is lined with deposited adhesive. In still another example embodiment, the secondary embedding process can involve pressing a pre-coated adhesive object into a channel or a surface of a substrate followed by exposure thereof to a curing. In some example embodiments, the secondary embedding process can include extruding a thermoplastic and a thermoplastic embedded wire. In still another example embodiment, the secondary embedding process can include pressing the object into a channel and stapling the metal object into a structure of the substrate at regular intervals.

In still another example embodiment, the secondary embedding process can include pressing a pre-adhesive-coated metal foil onto a 3D printed surface; milling metal foil to expose a fraction of an underlying 3D printed surface; continuing 3D printing to ensure adhesion of new thermoplastic layers to exposed underlying thermoplastic layers; and once complete, providing a fully embedded and integrated foil piece within a thermoplastic structure.

In some example embodiments, the secondary embedding process can involve simultaneously depositing the metal object(s) and the material, wherein the metal object is embedded within the thermoplastic material. In some example embodiments, the metal object may be a copper wire.

In another example embodiment, a three-dimensional electronic or electromechanical apparatus can be implemented, which includes one or more layers of a three-dimensional substrate deposited on a substrate; and one or more 3D printed components configured on the substrate with the metal object utilizing additive manufacturing enhanced by a secondary embedding process.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method of making an electronic or electromechanical device, the method comprising:
   creating at least one layer of a substrate by depositing the substrate via additive manufacturing;
   attaching a pre-adhesive-coated metal foil onto the substrate;
   milling the metal foil to expose a fraction of the substrate underlying the metal foil; and
   depositing additional layers of the substrate over the metal foil to completely embed the metal foil in the substrate, wherein the additional layers of the substrate adhere to the substrate exposed from milling the metal foil.

2. A method of making an electronic or electromechanical device, the method comprising:
   creating at least one layer of a thermoplastic substrate by depositing the substrate via additive manufacturing;
   dispensing a metal wire onto the substrate from a moving wire-dispensing tip; and
   extruding adjacent thermoplastic filaments simultaneously from two parallel extrusion tips that trail behind the wire-dispensing tip, wherein the metal wire is dispensed on the substrate before overlaying said thermoplastic filaments, wherein the wire-dispensing tip is aligned to dispense the metal wire centered below an interface between the adjacent thermoplastic filaments, wherein the metal wire is embedded under said thermoplastic filaments.

3. The method of claim 2 wherein the metal wire comprises a copper wire.

* * * * *